United States Patent
Masputra et al.

(10) Patent No.: US 10,798,224 B2
(45) Date of Patent: Oct. 6, 2020

(54) METHODS AND APPARATUS FOR PREVENTING PACKET SPOOFING WITH USER SPACE COMMUNICATION STACKS

(71) Applicant: Apple Inc., Cupertino, CA (US)

(72) Inventors: Cahya Adiansyah Masputra, Cupertino, CA (US); Wei Shen, Cupertino, CA (US); Sandeep Nair, Cupertino, CA (US); Dieter Wilfred Siegmund, Cupertino, CA (US); Darrin Jewell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 16/146,324

(22) Filed: Sep. 28, 2018

(65) Prior Publication Data

US 2019/0303221 A1 Oct. 3, 2019

Related U.S. Application Data

(60) Provisional application No. 62/649,509, filed on Mar. 28, 2018.

(51) Int. Cl.
*H04L 29/06* (2006.01)
*G06F 13/16* (2006.01)
(Continued)

(52) U.S. Cl.
CPC .......... *H04L 69/162* (2013.01); *G06F 3/0604* (2013.01); *G06F 3/0631* (2013.01);
(Continued)

(58) Field of Classification Search
CPC .......... G06F 9/545; G06F 9/52; G06F 9/5005; G06F 13/1668; G06F 3/0604;
(Continued)

(56) References Cited

U.S. PATENT DOCUMENTS 6,032,179 A 2/2000 Osborne
7,111,307 B1 9/2006 Wang
(Continued)

OTHER PUBLICATIONS

Moon-Sang Lee, Joonwon Lee and S. Maeng, "Context-aware address translation for high-performance SMP cluster system," 2008u IEEE International Conference on Cluster Computing, Tsukuba, 2008, pp. 292-297, doi: 10.1109/CLUSTR.2008.4663784. (Year: 2008).

*Primary Examiner* — Arvin Eskandarnia
*Assistant Examiner* — Chhian (Amy) Ling
(74) *Attorney, Agent, or Firm* — Gazdzinski & Associates, PC

(57) ABSTRACT

Methods and apparatus for efficient data transfer within a user space network stack. Unlike prior art monolithic networking stacks, the exemplary networking stack architecture described hereinafter includes various components that span multiple domains (both in-kernel, and non-kernel). For example, unlike traditional "socket" based communication, disclosed embodiments can transfer data directly between the kernel and user space domains. Direct transfer reduces the per-byte and per-packet costs relative to socket based communication. A user space networking stack is disclosed that enables extensible, cross-platform-capable, user space control of the networking protocol stack functionality. The user space networking stack facilitates tighter integration between the protocol layers (including TLS) and the application or daemon. Exemplary systems can support multiple networking protocol stack instances (including an in-kernel traditional network stack).

20 Claims, 12 Drawing Sheets

(51) Int. Cl.

| | | |
|---|---|---|
| *G06F 3/06* | (2006.01) | |
| *G06F 9/46* | (2006.01) | |
| *G06F 9/50* | (2006.01) | |
| *G06F 9/54* | (2006.01) | |
| *G06F 12/02* | (2006.01) | |
| *H04L 12/859* | (2013.01) | |
| *H04L 12/851* | (2013.01) | |
| *H04L 12/863* | (2013.01) | |
| *H04L 12/935* | (2013.01) | |
| *H04L 12/861* | (2013.01) | |
| *G06F 9/455* | (2018.01) | |
| *H04L 12/801* | (2013.01) | |
| *H04L 12/46* | (2006.01) | |
| *G06F 9/48* | (2006.01) | |
| *G06F 12/10* | (2016.01) | |
| *H04L 12/841* | (2013.01) | |
| *G06F 9/52* | (2006.01) | |
| *H04L 12/26* | (2006.01) | |
| *G06F 16/23* | (2019.01) | |
| *G06F 21/52* | (2013.01) | |
| *H04L 12/833* | (2013.01) | |
| *H04L 12/835* | (2013.01) | |
| *H04L 12/823* | (2013.01) | |
| *H04L 12/865* | (2013.01) | |
| *G06F 21/56* | (2013.01) | |
| *G06F 16/22* | (2019.01) | |
| *H04L 29/12* | (2006.01) | |
| *H04L 29/08* | (2006.01) | |
| *H04L 1/00* | (2006.01) | |

(52) U.S. Cl.
CPC .......... *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01); *G06F 9/5022* (2013.01); *G06F 9/52* (2013.01); *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(58) Field of Classification Search
CPC .... G06F 3/0631; G06F 3/0644; G06F 3/0673; G06F 9/461; G06F 9/5022; G06F 9/542; G06F 12/023; G06F 9/45558; G06F 16/2365; G06F 21/52; G06F 21/568; G06F 16/2228; G06F 9/4881; G06F 9/5016; G06F 12/10; H04L 69/161; H04L 69/162; H04L 47/2475; H04L 47/2483; H04L 47/6295; H04L 49/30; H04L 49/9052; H04L 69/02; H04L 47/193; H04L 47/283; H04L 43/0864; H04L 47/2458; H04L 47/30; H04L 47/32; H04L 47/6275; H04L 69/22; H04L 61/103; H04L 61/2542; H04L 67/146; H04L 69/18; H04L 69/163
See application file for complete search history.

(56) References Cited

U.S. PATENT DOCUMENTS

| | | | |
|---|---|---|---|
| 7,152,231 | B1 | 12/2006 | Galluscio et al. |
| 9,135,059 | B2 | 9/2015 | Ballard et al. |
| 10,289,555 | B1 | 5/2019 | Michaud et al. |
| 2001/0037410 | A1 | 11/2001 | Gardner |
| 2002/0053011 | A1 | 5/2002 | Aiken et al. |
| 2003/0061395 | A1 | 3/2003 | Kingsbury et al. |
| 2004/0010473 | A1 | 1/2004 | Hsu et al. |
| 2005/0278498 | A1 | 12/2005 | Ahluwalia et al. |
| 2006/0248542 | A1 | 11/2006 | Wang et al. |
| 2007/0183418 | A1 | 8/2007 | Riddoch et al. |
| 2008/0005794 | A1 | 1/2008 | Inoue et al. |
| 2008/0148291 | A1 | 6/2008 | Huang et al. |
| 2009/0240874 | A1* | 9/2009 | Pong ................ G06F 12/0223 711/105 |
| 2009/0265723 | A1 | 10/2009 | Mochizuki et al. |
| 2010/0049876 | A1* | 2/2010 | Pope .................... H04L 49/90 709/250 |
| 2010/0118041 | A1 | 5/2010 | Chen et al. |
| 2011/0161619 | A1 | 6/2011 | Kaminski et al. |
| 2012/0036334 | A1 | 2/2012 | Norman et al. |
| 2012/0260017 | A1 | 10/2012 | Mine et al. |
| 2014/0355606 | A1* | 12/2014 | Riddoch ............... H04L 12/18 370/390 |
| 2015/0081985 | A1 | 3/2015 | Archer et al. |
| 2015/0261588 | A1 | 9/2015 | Liu et al. |
| 2015/0363110 | A1 | 12/2015 | Batra et al. |
| 2016/0103480 | A1 | 4/2016 | Sanghi et al. |
| 2016/0103689 | A1 | 4/2016 | Sanghi et al. |
| 2016/0231929 | A1 | 8/2016 | Tsirkin |
| 2017/0003977 | A1 | 1/2017 | Sumida et al. |
| 2017/0075856 | A1 | 3/2017 | Suzue et al. |
| 2017/0147282 | A1 | 5/2017 | Seo |
| 2017/0187621 | A1* | 6/2017 | Shalev ................ H04L 45/745 |
| 2017/0264497 | A1* | 9/2017 | Lim .................... H04L 45/745 |
| 2017/0286322 | A1 | 10/2017 | Garg et al. |
| 2017/0337588 | A1* | 11/2017 | Chittilappilly ..... G06Q 30/0277 |
| 2017/0371591 | A1 | 12/2017 | Xia et al. |
| 2018/0004690 | A1 | 1/2018 | Kaminski et al. |
| 2018/0295052 | A1 | 10/2018 | St-Laurent |

\* cited by examiner (PRIOR ART APPLICATION)

METHODS AND APPARATUS FOR PREVENTING PACKET SPOOFING WITH USER SPACE COMMUNICATION STACKS

PRIORITY

This application claims the benefit of priority to U.S. Provisional Patent Application Ser. No. 62/649,509 filed Mar. 28, 2018 and entitled "Methods and Apparatus for Efficient Data Transfer within User Space Networking Stack Infrastructures", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

2. DESCRIPTION OF RELATED TECHNOLOGY

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack. More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

In one aspect, a method for validating packets for a user space communication stack is disclosed. In one embodiment, the method includes: opening a link between user space and kernel space by the user space communication stack; writing verification information to a flow entry table, the verification information being associated with the opening of the link; copying packets to a pool of resources subsequent to the writing of the verification information; and validating the copied packets by comparing the written verification information in the flow entry table to corresponding metadata associated with the copied packets.

In one variant, the writing of the verification information comprises populating the flow entry table through one or more kernel application programming interfaces (APIs).

In another variant, the populating of the flow entry table comprises writing one or more of a universally unique identifier (UUID) and tuple information associated with the user space communication stack.

In yet another variant, the user space communication stack is associated with a first party application and the validating includes validating one of the UUID or the tuple information.

In yet another variant, the user space communication stack is associated with a third party application and the validating includes validating both the UUID and the tuple information.

In yet another variant, the method further includes constructing a Transmission Control Protocol/Internet Protocol (TCP/IP) header for the copied packets subsequent to the validating of the copied packets, the constructing of the TCP/IP header occurring in the kernel space.

In yet another variant, the method further includes determining that one of the copied packets verification information does not match the written verification information in the flow entry table and in response to the determining, discarding the one of the copied packets.

In another aspect, a system for validating packets for a user space communication stack. In one embodiment, the system includes: an application that includes the user space communication stack, the application residing in user space; a first pool of dedicated memory resources for the application; a second pool of dedicated memory resources for a driver; a flow entry table configured for the validating of the packets; and a non-transitory computer readable apparatus including a storage medium having one or more computer programs stored thereon. In one exemplary embodiment, the one or more computer programs, when executed by a processing apparatus are configured to: write verification information to the flow entry table, the verification information being associated with an opening of a link between user space and kernel space by the application; write packets to the first pool of dedicated resources, by the application, subsequent to the writing of the verification information; copy packets to the second pool of dedicated resources; validate the copied packets in the second pool of dedicated resources by comparison of the written verification information in the flow entry table to verification information associated with the copied packets.

In one variant, the written verification information includes packet metadata.

In another variant, the packet metadata includes a universally unique identifier (UUID) and tuple information associated with the user space communication stack.

In yet another variant, the user space communication stack is associated with a first party application and the validation of the copied packets includes a validation of one of the UUID or the tuple information.

In yet another variant, the user space communication stack is associated with a third party application and the validation of the copied packets includes a validation of both the UUID and the tuple information.

In yet another variant, the one or more computer programs, when executed by the processing apparatus, are further configured to: determine that one of the copied packets verification information does not match the written verification information in the flow entry table and in response to the determination, discard the one of the copied packets.

In yet another aspect, a non-transitory computer readable apparatus including a storage medium having one or more computer programs stored thereon is disclosed. In one embodiment, the one or more computer programs, when executed by a processing apparatus, are configured to: write verification information to a flow entry table, the verification information being associated with an opening of a link between user space and kernel space by an application; copy packets to a pool of dedicated resources, subsequent to the writing of the verification information; and validate the copied packets in the pool of dedicated resources by comparison of the written verification information in the flow entry table to verification information associated with the copied packets.

In one variant, the writing of the verification information includes a write of packet metadata to the flow entry table.

In another variant, the writing of the packet metadata to the flow entry table includes a write of one or more of a universally unique identifier (UUID) and tuple information associated with a user space communication stack of the application.

In yet another variant, the user space communication stack is associated with a first party application and the validation includes a validation of one of the UUID or the tuple information.

In yet another variant, the user space communication stack is associated with a third party application and the validation includes a validation of both the UUID and the tuple information.

In yet another variant, the one or more computer programs, when executed by the processing apparatus, is further configured to: construct a Transmission Control Protocol/Internet Protocol (TCP/IP) header for the copied packets subsequent to the validating of the copied packets, the construction of the TCP/IP header occurring in the kernel space.

In yet another variant, the one or more computer programs, when executed by the processing apparatus, is further configured to: determine that one of the copied packets verification information does not match the written verification information in the flow entry table and in response to the determination, discard the one of the copied packets.

Other features and advantages of the present disclosure will immediately be recognized by persons of ordinary skill in the art with reference to the attached drawings and detailed description of exemplary embodiments as given below.

All figures © Copyright 2017-2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While embodiments are primarily discussed in the context of use in conjunction with an inter-processor communication link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "Methods and Apparatus for Control of a Jointly Shared Memory-Mapped Region", each of which being incorporated herein by reference in its entirety, it will be recognized by those of ordinary skill that the present disclosure is not so limited. In fact, the various aspects of the disclosure are useful in any device or network of devices where, for example, user space communication stacks introduce unique security vulnerabilities.

Existing Network Socket Technologies—

Figure 1:
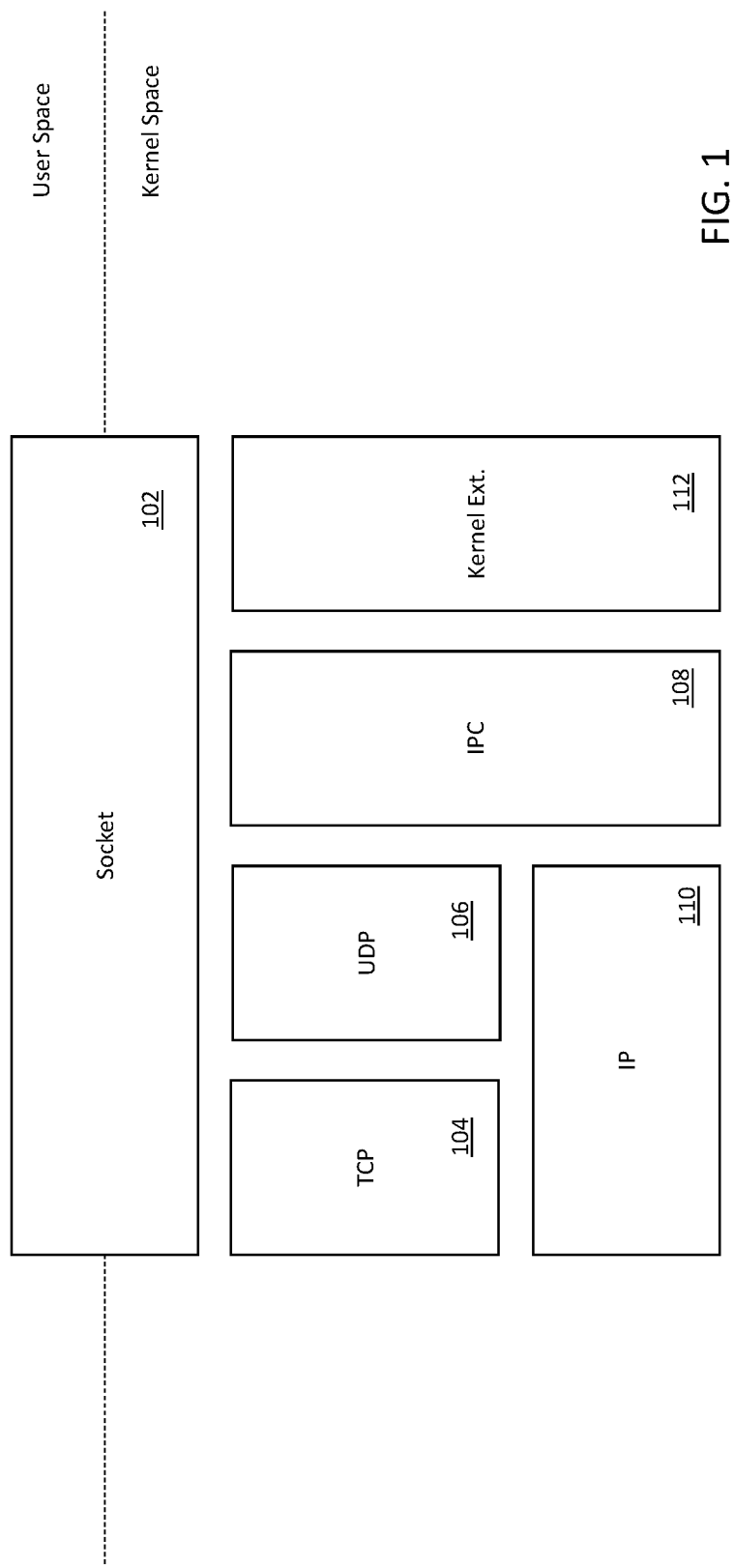
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Process Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An 0/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Process Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies—

Figure 2:
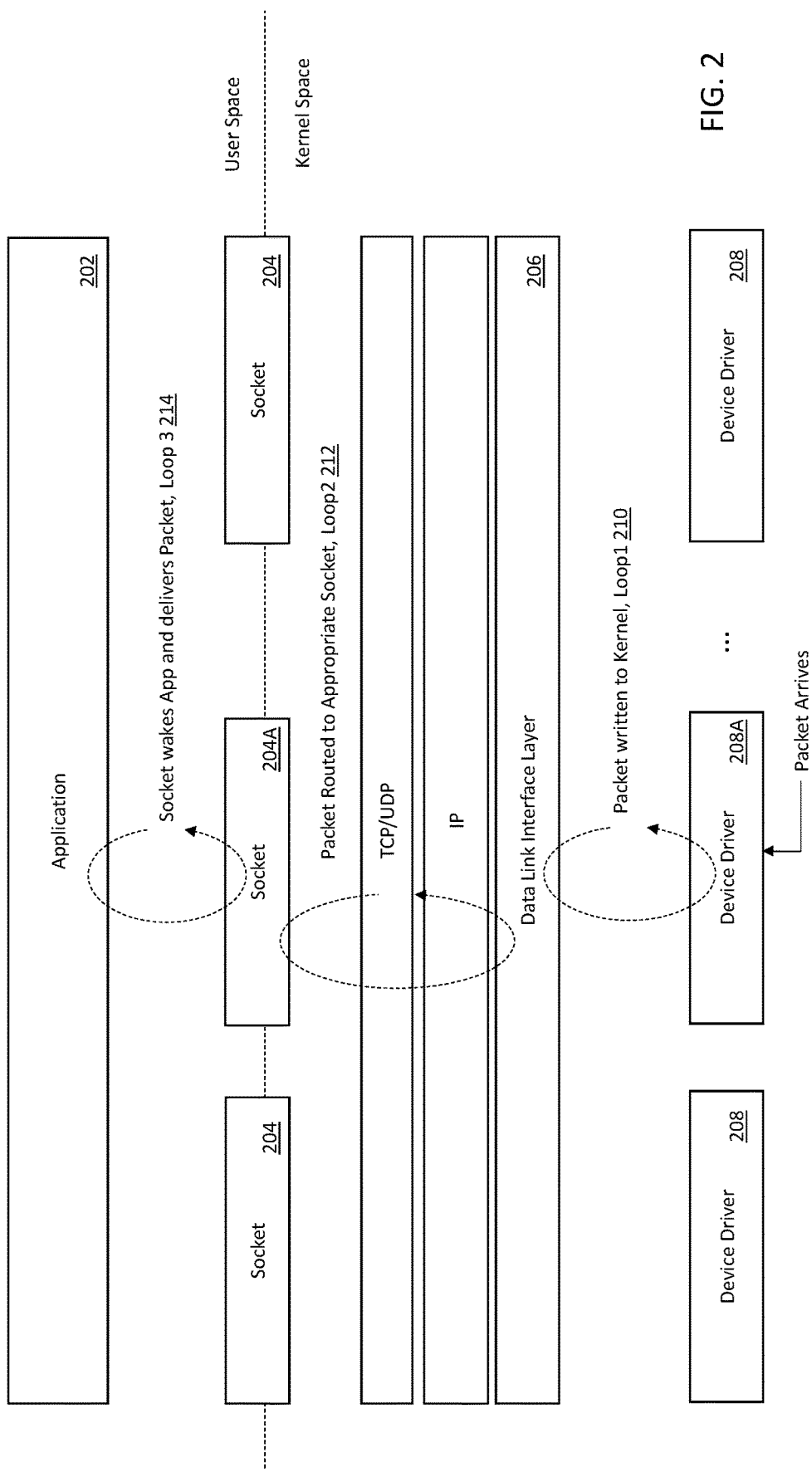
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases—

Figure 3:
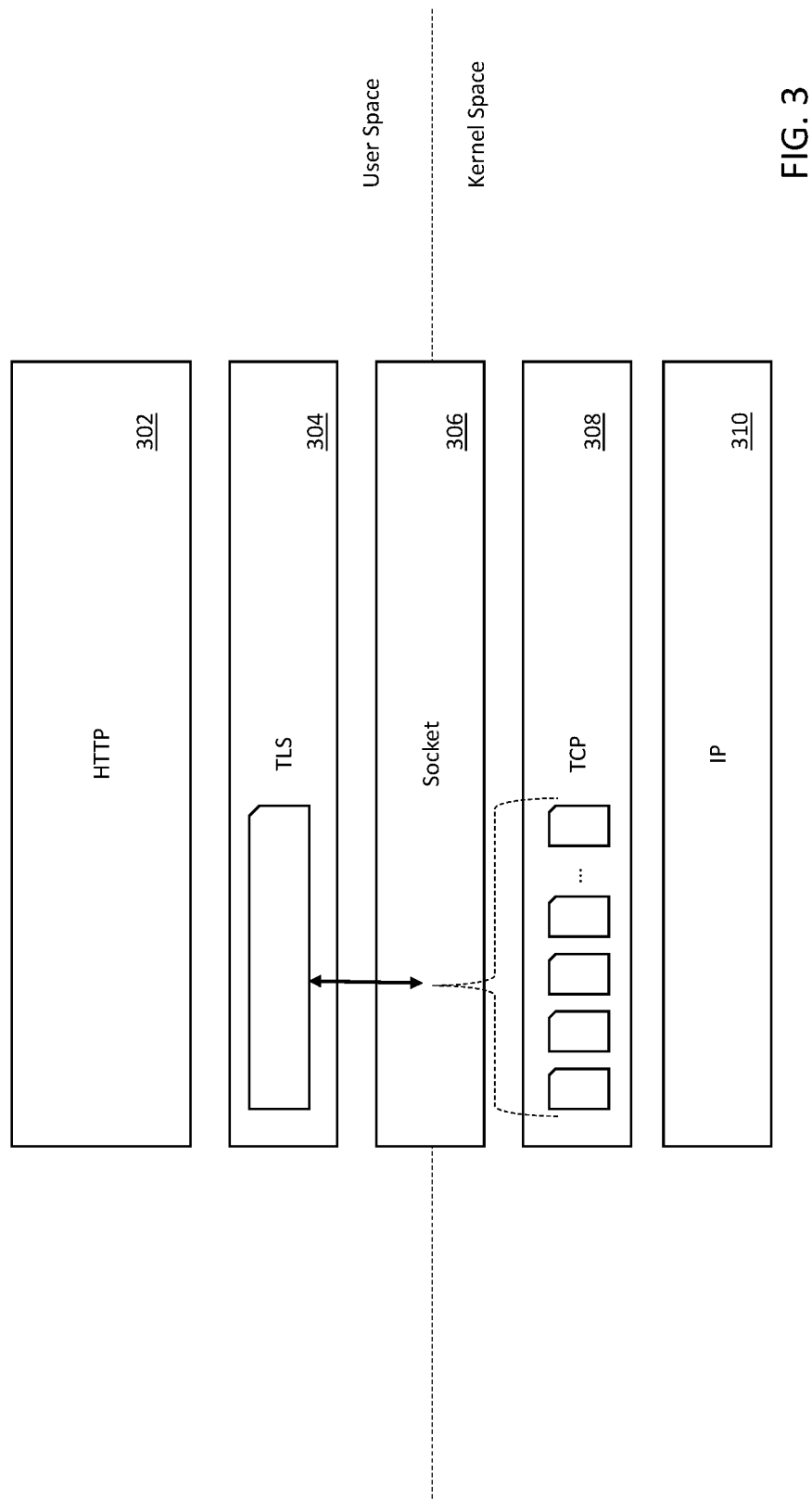
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some 3$^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
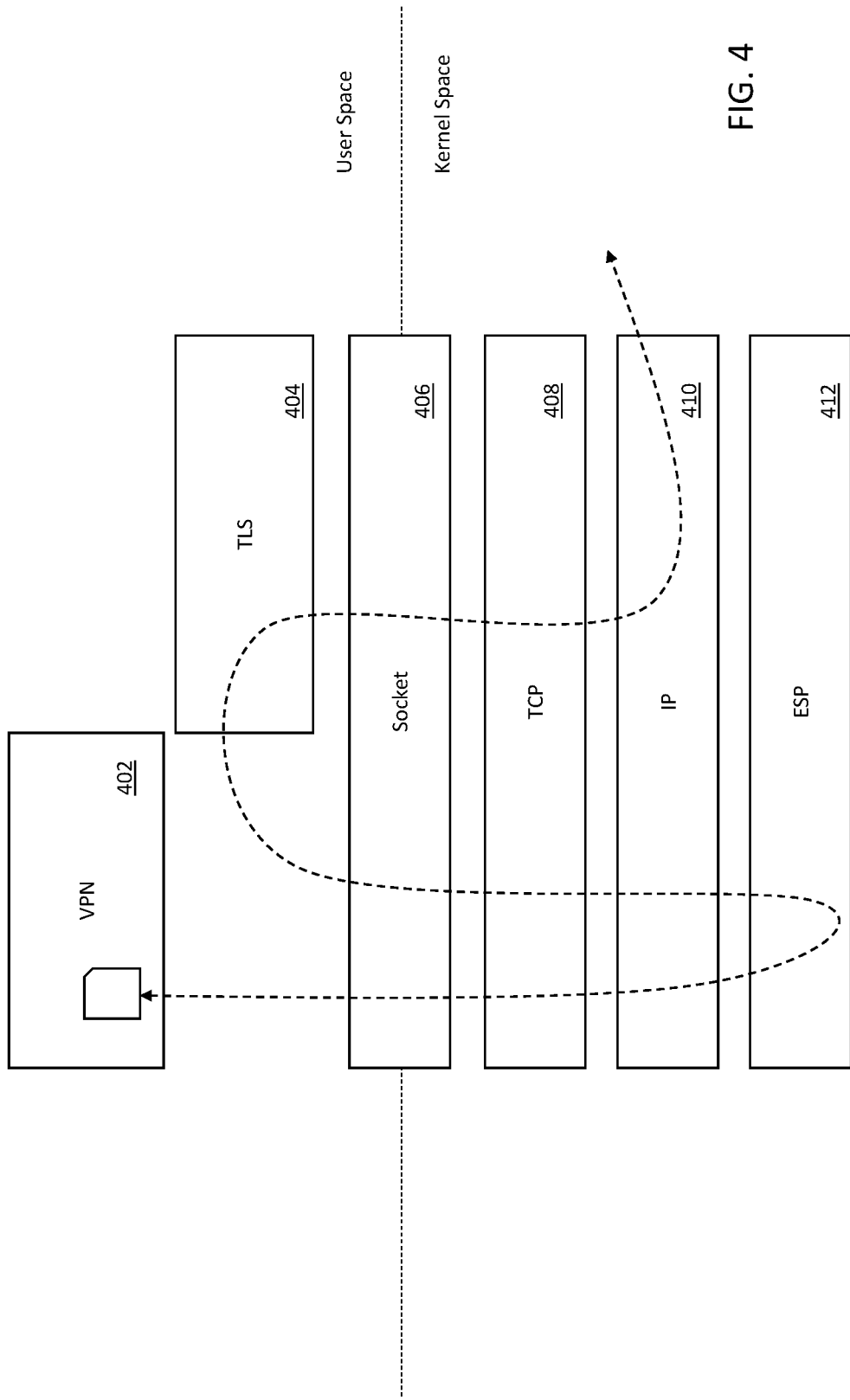
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
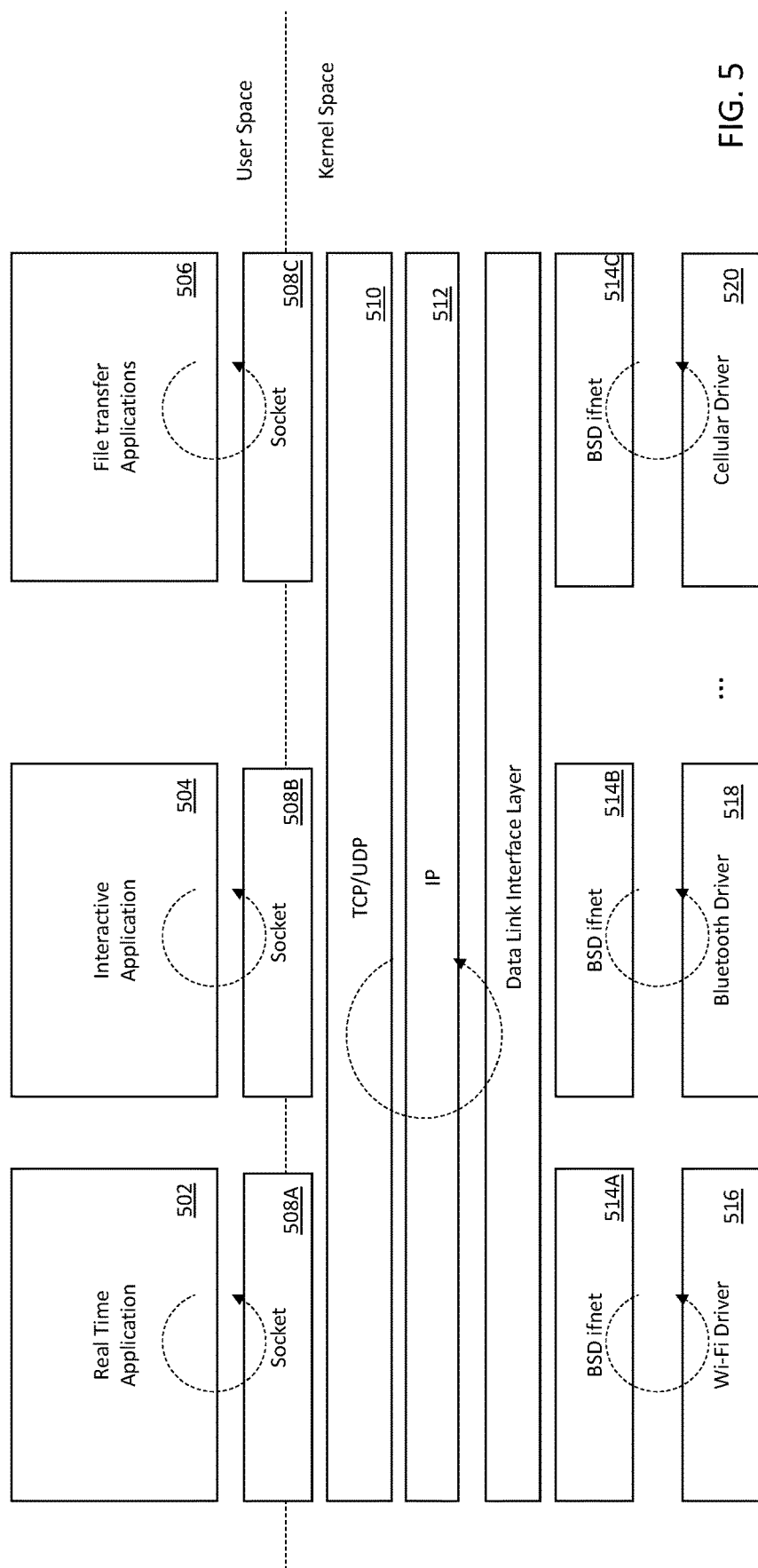
FIG. 5 is a logical block diagram of an exemplary implementation of application based tuning, useful for explaining various aspects of the present disclosure.

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.
Exemplary Networking Architecture—

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or daemon. In some cases, the user space architecture can expose low-level networking interfaces to transport protocols and/or encapsulation protocols such as UDP, TCP, and QUIC; and enable network protocol extensions and rapid development cycles. Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
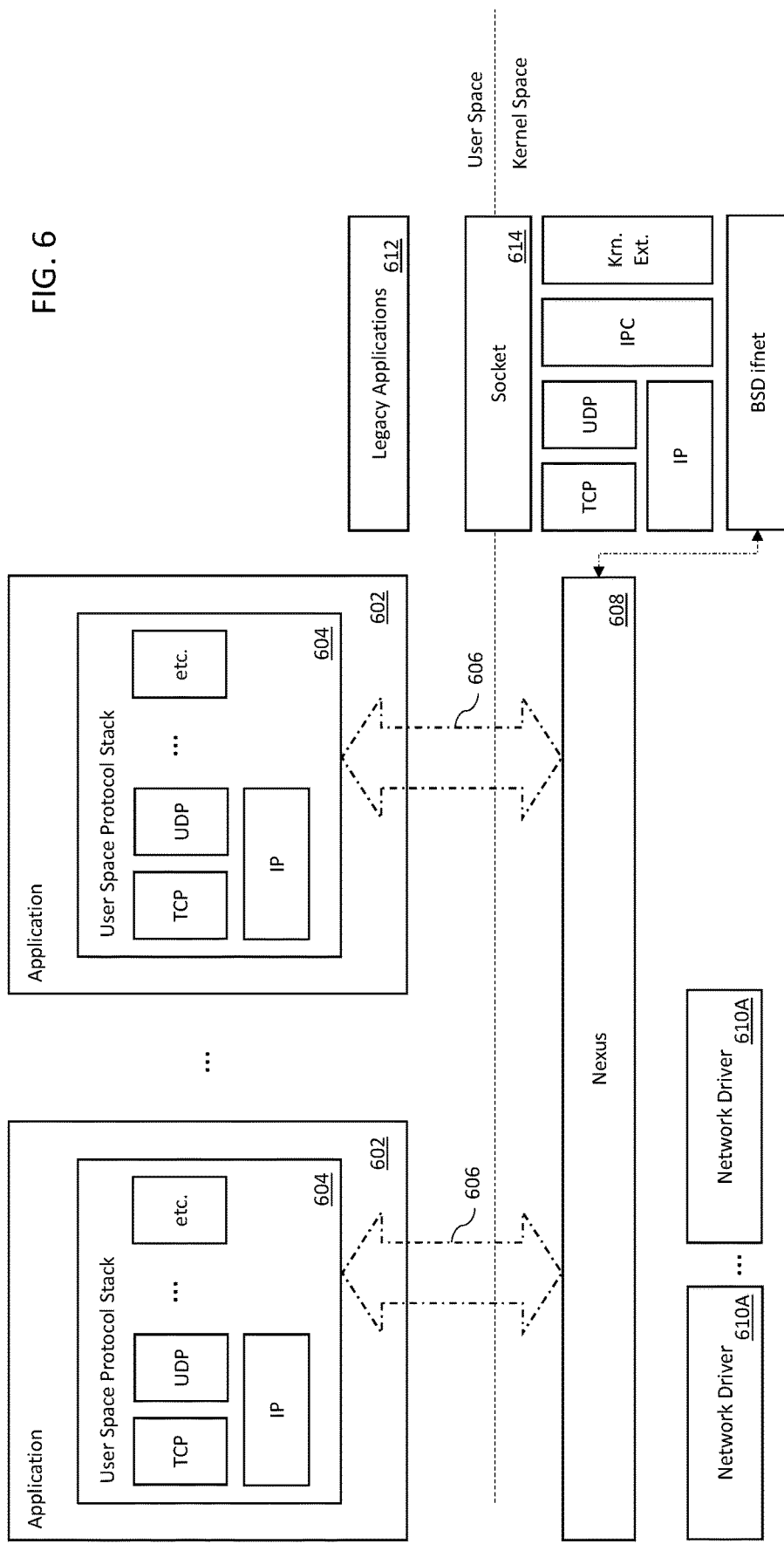
FIG. 6 is a logical representation of an exemplary networking stack architecture, in accordance with the various aspects of the present disclosure.

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary I/O Infrastructure—

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.)

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus—

In one exemplary embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one exemplary embodiment, the nexus 608 may additionally ensure that there is fairness and/or appropriately prioritize each of its connected stacks. For example, within the context of FIG. 6, the nexus 608 balances the network priorities of both the existing user space protocol stacks 604, as well as providing fair access for legacy socket based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see Protocol Unloading and Offloading, discussed infra).

Exemplary Network Extensions—

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations—

In one exemplary optimization of the present disclosure, the nexus includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch nexus instance. For example, as previously noted, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading—

In the foregoing discussions, the improvements to user space operation may be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance. As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded.

For example, consider Address Resolution Protocol (ARP) request handling; when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack—

Figure 7:
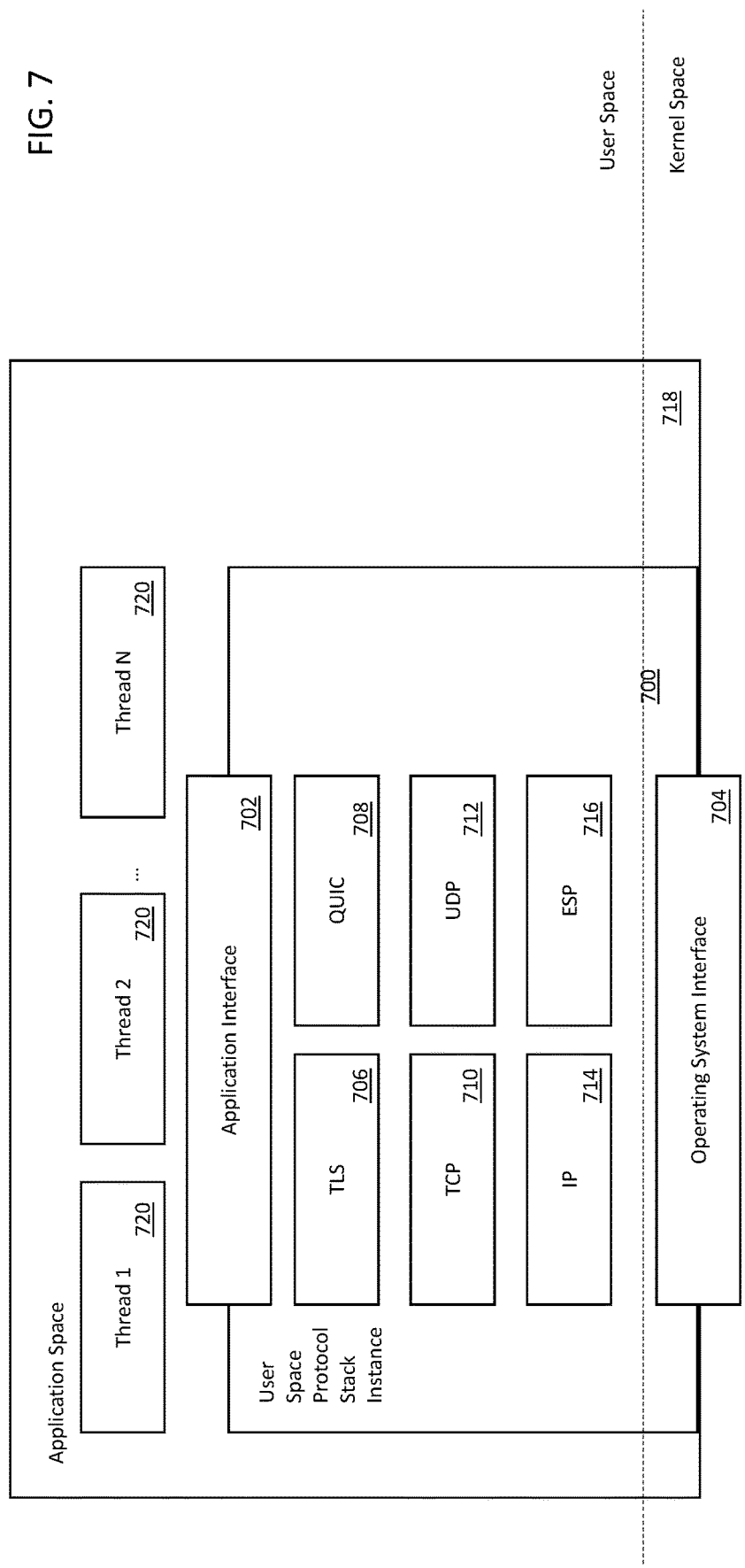
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation—

Figure 8:
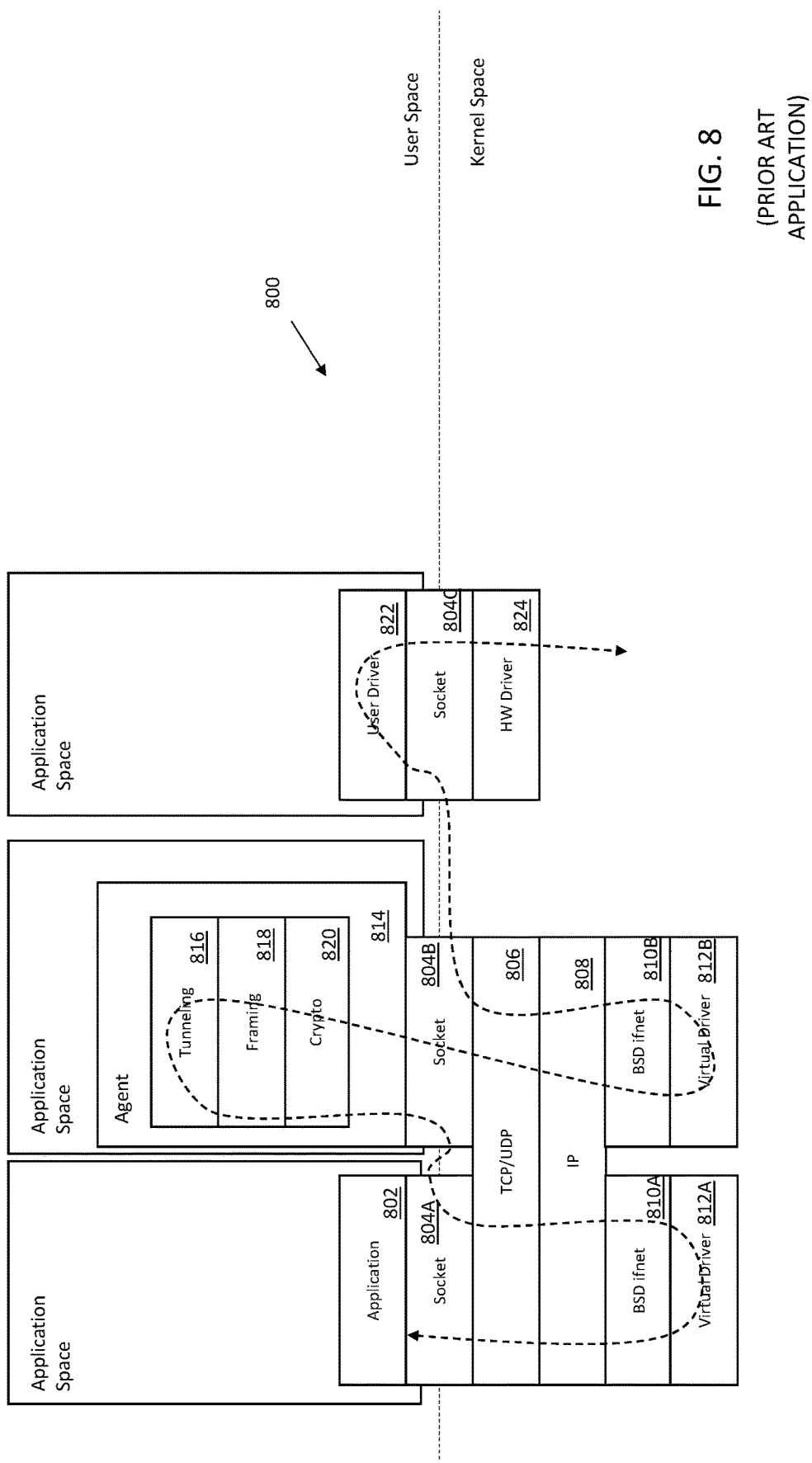
FIG. 8 is a logical flow diagram useful to summarize the convoluted data path taken for a prior art application using a proxy agent application within the context of the traditional networking stack, useful for explaining various aspects of the present disclosure.

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

Figure 9:
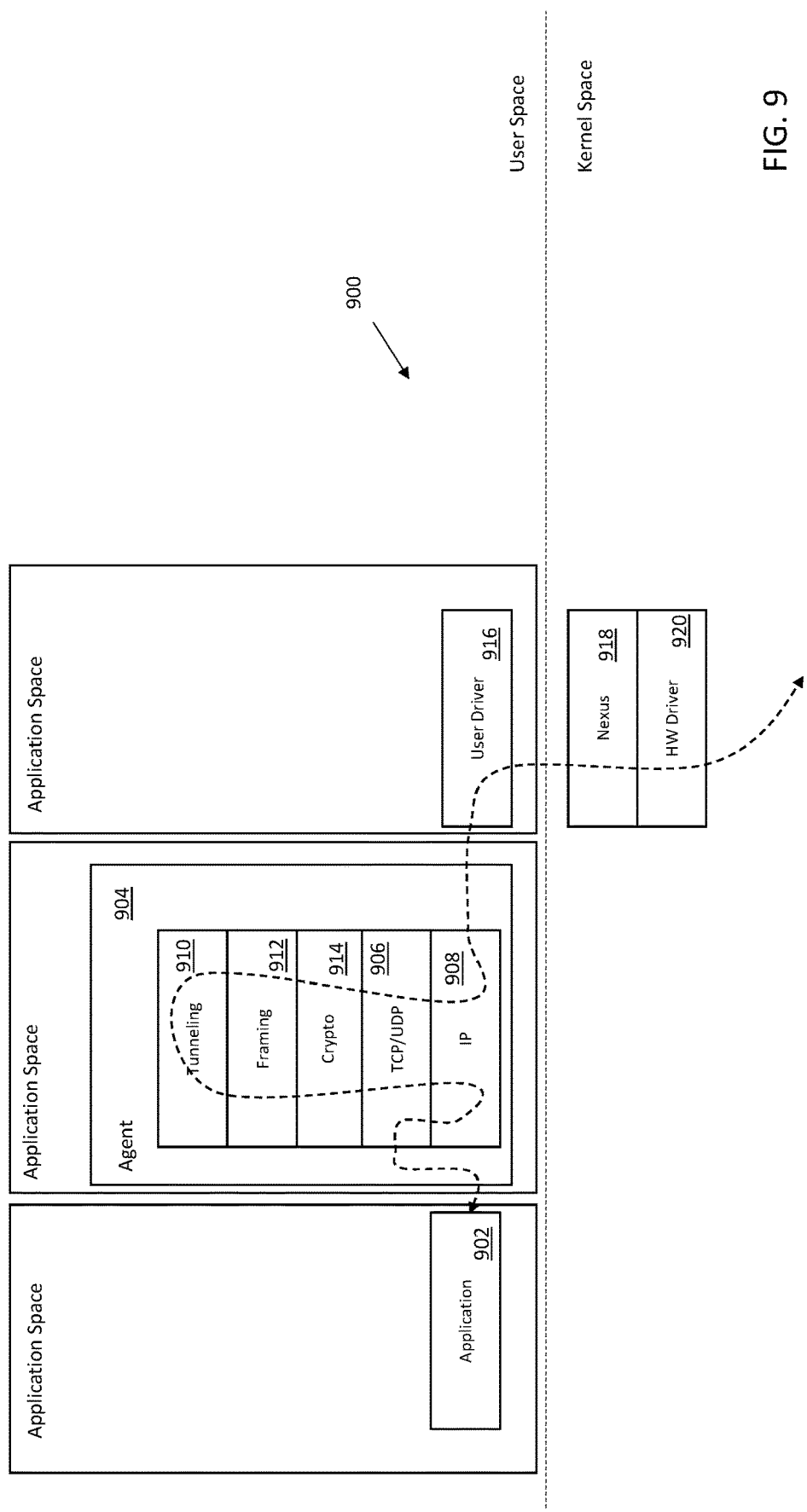
FIG. 9 is a logical flow diagram useful to summarize an exemplary proxy agent application within the context of the user space networking stack, in accordance with various aspects of the present disclosure.

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with nexus 918 for the one (and only) domain crossing into kernel space. Thereafter, the nexus 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

Preventing IP Address/Port Spoofing—

In traditional communications stack implementations (e.g., a legacy BSD communications stack), user space data is written to the socket in a "bulk data" format (without packetization, TCP/IP headers, or other communication protocol information). Subsequent to being written to the socket, the user space data is read by a kernel process where this bulk data format user space data is packaged into packets for transfer via e.g., the BSD communication stack. These traditional communications stack implementations were generally considered "trusted" as the user space would not have access to, inter alia, the generation of network addresses used for the actual packet transfer. In other words, packet addressing was handled by the kernel space which is traditionally considered more secure than if this addressing was handled in user space. Additionally, user space applications would not readily have access to tools in order to, inter alia, re-format these packets in a malicious way.

Implementation of communication stacks within the user space as is described elsewhere herein may introduce unique security vulnerabilities. For example, a so-called "TOC-TOU" attack is a class of software bugs that are caused by differences between the "Time of Check" (TOC) and the "Time of Use" (TOU) of data. Traditionally, a kernel process would check user data before use, in order to ensure that the data was valid (or "clean"). For various reasons, there may be a gap in time between the TOC and the TOU. Accordingly, in a TOCTOU attack, an attacker may repeatedly write a malicious value to the user data. Although the kernel process would catch most of these malicious writes, eventually a malicious write may hit the gap between the TOC and the TOU. This may be particularly problematic where each user stack process creates the network packets themselves (as is described elsewhere herein). For example, a malicious attacker may use a TOCTOU attack to write a malformed packet in order to, e.g., access the kernel process or otherwise attack another network entity. More directly, since networking stacks (e.g., TCP/IP) are in user space in implementations of the present disclosure, it is conceivable that packets may be generated that are not otherwise allowed from that particular TCP/IP instance. In other words, user space communication stacks may be susceptible to malicious activity and could generate packets that don't belong to a given source IP address/source port address, etc.

Figure 10:
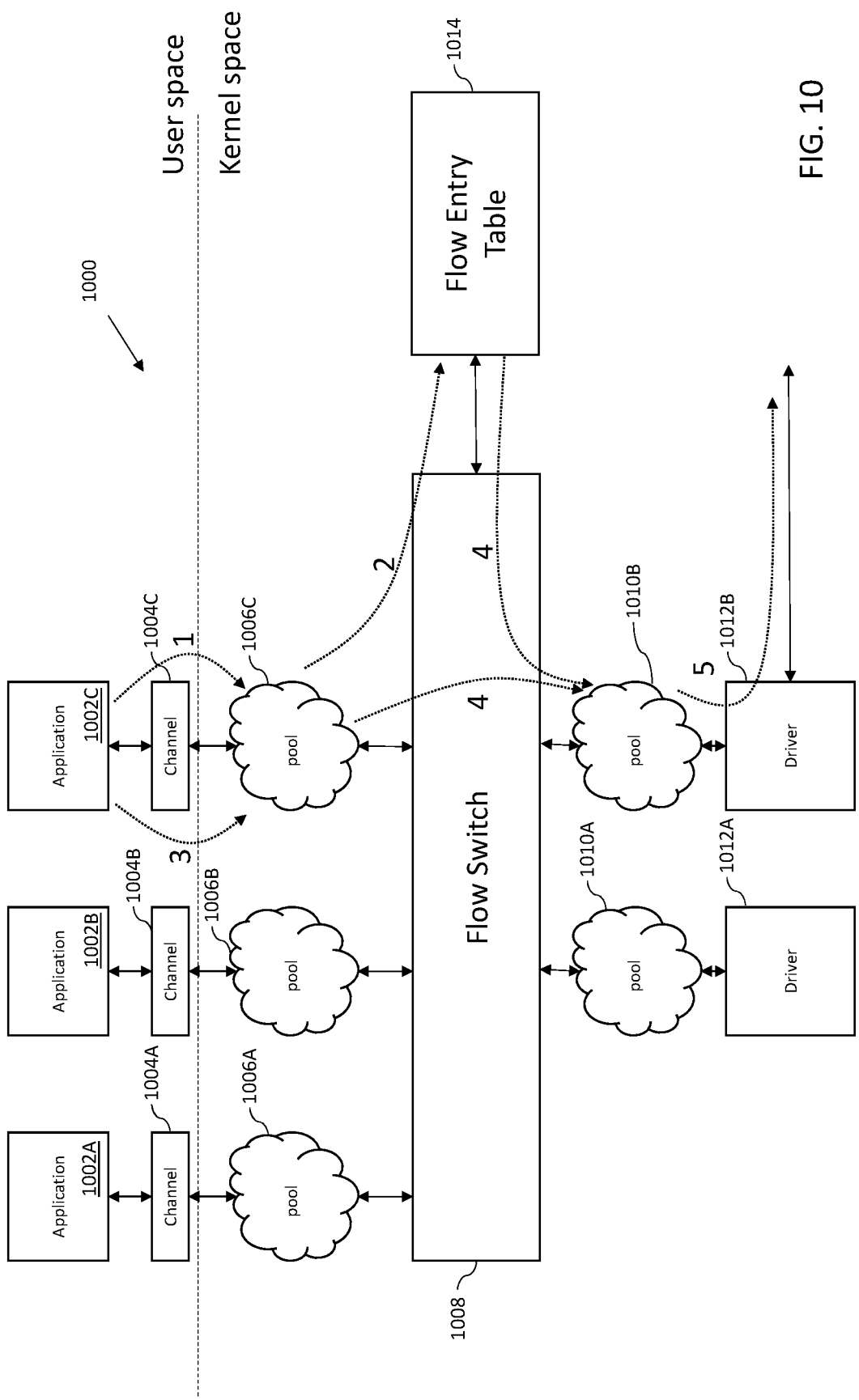
FIG. 10 is a logical representation of a system for prevention of packet spoofing, in accordance with various aspects of the present disclosure.

Referring now to FIG. 10, one exemplary implementation for a system 1000 that addresses the foregoing deficiencies is shown and described in detail. This exemplary system 1000 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein. Moreover, while a specific architecture is shown in FIG. 10, it would be readily apparent to one of ordinary skill given the contents of the present disclosure that the illustrated topology shown in, for example, FIG. 10 may be readily modified to include one or more applications 1002, one or more channels 1004, one or more pool of resources 1006 associated with a respective application, one or more flow switches 1008, one or more pool of resources 1010 managed by, for example, one or more drivers 1012, and one or more flow entry tables 1014. These and other variants would be readily understood by one or ordinary skill given the contents of the present disclosure with the illustration contained within FIG. 10 merely being exemplary.

FIG. 10 illustrates three applications 1002A, 1002B, and 1002C that reside within user space. One or more of these applications 1002A, 1002B, and 1002C may include its own communications stack as is described in additional detail supra. Each of these applications 1002A, 1002B, and 1002C may further communicate (step 1) with the kernel space through respective channels 1004A, 1004B, and 1004C which are coupled with a respective pool of dedicated resources 1006A, 1006B, and 1006C. Some (or all) of the data resident within these pools of dedicated resources 1006A, 1006B, and 1006C may be communicated to managed pools of resources 1010A, 1010B via a flow switch apparatus 1008.

As shown in FIG. 10, each single entity 1012 (e.g., driver) managed pool of resources 1010 is separate and distinct from the pool of resources 1006 associated with respective applications 1002. The single entity 1012 may control access to the managed pool of resources 1010; for example, the single entity 1012B determines an allocation of pool resources 1010B for transferring the data stored in any one or more of pool resources 1006A, 1006B, 1006C. Similarly, each channel 1004 may control access to its managed pool of resources 1006; for example, the channel 1004 reads and writes to its corresponding allocation of pool resources 1006 for receipt/delivery.

The management and operation of these managed pools of resources 1006, 1010 is described in co-owned and co-pending U.S. patent application Ser. No. 16/144,992 filed Sep. 27, 2018 and entitled "Methods and Apparatus for Single Entity Buffer Pool Management", the contents of which being incorporated herein by reference in its entirety. Consider a usage scenario where application created packets are copied (or transferred) from one of the pool of dedicated resources 1006 associated with a respective application to the single-entity managed pool of resources 1010 via the flow switch apparatus 1008. After a kernel process copies (transfers) this data, but before this data is ultimately used, the kernel process may perform a validation check on this data. This validation check on the data (e.g., packets) is performed via use of the flow entry table 1014. This validation process ensures that data that is copied (or transferred) to a driver 1012 is valid. In other words, the validation process ensures that the packets belonging to a flow generated in user space cannot, for example, spoof another flow. In the present context, the term "flow" refers to a combination of addresses, ports, etc. In some implementations, the contents of the flow entry table 1014 for the validation process are generated when the user space communications stack opens (creates) a link in order to transact packets with e.g., an internal or external entity.

Figure 11:
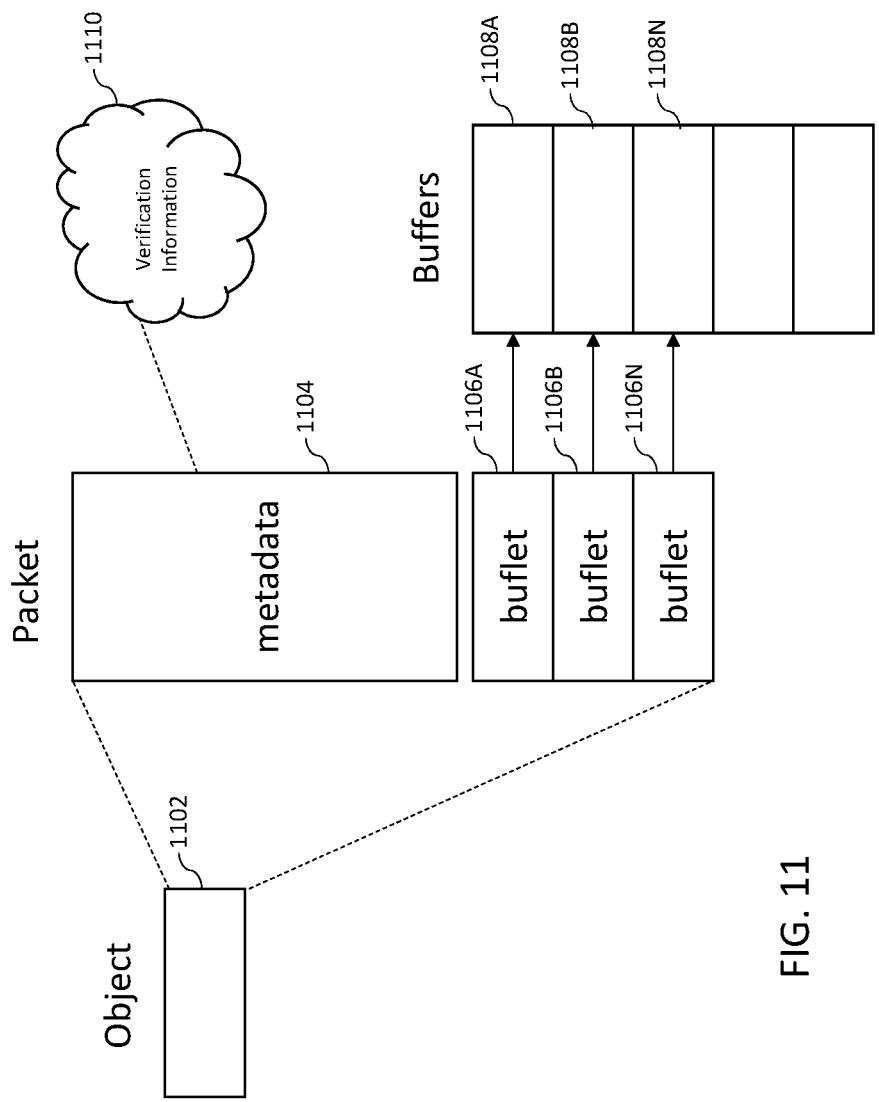
FIG. 11 is a logical representation of one exemplary data packet structure for use with, for example, the system of FIG. 10, in accordance with various aspects of the present disclosure.

As a brief aside, and referring now to FIG. 11, the data that is copied (or transferred) is composed of so-called objects 1102. Within each object 1102, one or more packets of data are contained therein. These packets include packet metadata 1104 as well as one or more so-called "buflets" 1106. As described elsewhere herein, metadata 1104 may generally fall into one or more of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects 1102 are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.). Collectively, this metadata 1104 may also include verification information 1110 which is used along with the flow entry table (1014, FIG. 10) in order to perform the validation process. The verification information 1110 may include, for example, a universally unique identifier (UUID). A UUID is, for practical purposes, considered unique and is otherwise not dependent upon a central registration authority or coordination amongst, for example, applications which will ultimately utilize the data associated with a given UUID.

In addition to, or alternatively than, the aforementioned UUID, the verification information 1110 may include other types of information that may be used to validate the data prior to use. For example, and in the exemplary context of TCP/IP, a so-called "5-tuple" may be used as verification information 1110. The term 5-tuple refers to a set of five different values that make up a TCP/IP connection. These five different values may include a source IP address, a source port number, a destination IP address, a destination port number, and the protocol that is in use (i.e., TCP). In the context of some server-type applications, the destination may not yet have been determined. In such a scenario, a so-called "3-tuple" may be used as verification information 1110. A 3-tuple may have three different values that are used in the validation process and will include a source IP address, a source port number, and the protocol in use. The packet may further include one or more buflets 1106 which may include, for example, a pointer that references a respective backing buffer memory 1108.

Referring back to FIG. 10, when a user space stack (e.g., application 1002C) opens (or creates) a link in order to transact data, a packet (or a portion thereof) is written (step 1) to a pool of resources (e.g., pool of resources 1006C) that may be associated with a given application (e.g., application 1002C). In some implementations, the flow entry table 1014 may be populated (e.g., with verification information) (step 2) via one or more Application Programming Interface(s) (APIs) that have been exposed by the kernel. Alternatively, the flow switch 1008 may read the packets (or portions thereof) to identify verification information to populate the flow entry table 1014. For example, the packet metadata may be read from the pool of resources 1006C and copied into the flow entry table 1014. These and other variants would be readily apparent to one of ordinary skill given the contents of the present disclosure.

As discussed supra, this verification information (1110, FIG. 11) may include one or both of the UUID and the tuple information. In implementations that only utilize one of the UUID or the tuple information, the security against, for example, TOCTOU type attacks may be less robust; however, less memory resources would be required for implementation and the implementation of the validation process may be faster and/or less processor resource intensive than a validation process that requires both the UUID and the tuple. In other variants, checking both the UUID and tuple may be unnecessary in view of other security measures. For example, implementations that only check the UUID might be paired with other subsequent layers or mechanisms of protections that cover tuple information, and vice versa.

Additionally, implementations that utilize only one of the UUID or the tuple information, while technically less robust, may be suitable for use with first party applications (which are trusted). As a brief aside, first party applications are typically fully owned by the developer (manufacturer) of the system 1000 itself. For example, the Assignee of the present disclosure also develops its own applications (e.g., FaceTime). In such a scenario, and as a result of, inter alia, common business and economic interests, and access to development information that others may not necessarily be privy to, the use of a less robust validation process may be desirable for the reasons as set forth above. So-called second party application developers may be partially owned by the developer (manufacturer) of the system itself, while third party application developers are generally independent. The use of less robust verification information may be acceptable for first party application developers, but more robust verification information may be required for second or third party application developers.

Subsequent to entry of verification information (1110, FIG. 11) into the flow entry table 1014, the application 1002C may begin transfer (e.g., write) (step 3) additional packets to the user (application) pool of resources 1006C. The packets (or portions thereof) are copied (step 4) to the single entity managed (e.g., driver) pool of resources 1010B, or a temporary buffer. For example, the protocol headers for these packets may be transferred to the single entity managed pool of resources 1010B (or the temporary buffer). Prior to transfer of these packets from the single entity managed pool of resources 1010B to the driver, the flow switch apparatus 1008 may compare (step 4) the verification information contained within these packets with the verification information stored within the flow entry table 1014. The successfully validated packets can be used by the driver 1012B for transmission (step 5) to, for example, the intended destination. Conversely, if individual packets are not validated by the flow entry table 1014 entry, these packets may be "ignored", discarded, or otherwise not processed.

The foregoing process isolates application 1002C transactions to pool 1006C, from driver 1012B transactions with the pool 1010B. More directly, even if application 1002C were attacked with e.g., a TOCTOU attack, the packets from 1004C are copied into the pool 1010B prior to validation checking. Subsequent TOCTOU writes would only change the packet data in 1004C (not the data in pool 1010B). Isolating the pools protects against TOCTOU attacks because isolation ensures that only validated (checked) data is used by the driver 1012B.

In some implementations, the system 1000 may include "single pool" configurations where a single pool is used (rather than two pools 1006, 1010). In such implementations, the packet metadata (or portions thereof) can be copied into a temporary buffer for validation. The copied packet metadata may then be validated through the validation process prior to using the packets of the pool. In such an implementation, it may be desirable to prevent an application from reading to/or writing from the data associated with the stored packet metadata. While such an implementation may be less robust, it may be suitable for some application developers (e.g., first party application developers).

In some embodiments, the user space communication stack may generate headers for its packets, however the kernel space may implement "firewall" logic isolating the user space communication stack from the external network. More directly, the kernel process may ultimately be responsible for constructing the e.g., TCP/IP header for the validated packet that is used by the driver. In some such implementations, the flow entry table 1014 is populated with packet metadata that is generated by the user space communication stack (not the packet headers generated by the kernel). Such an implementation may be desirable in that less robust verification information may be used. For example, the validation process may only check (validate) the packet UUID. However, requiring the kernel process to construct the TCP/IP header information may involve additional kernel complexity and more kernel responsibility.

Figure 12:
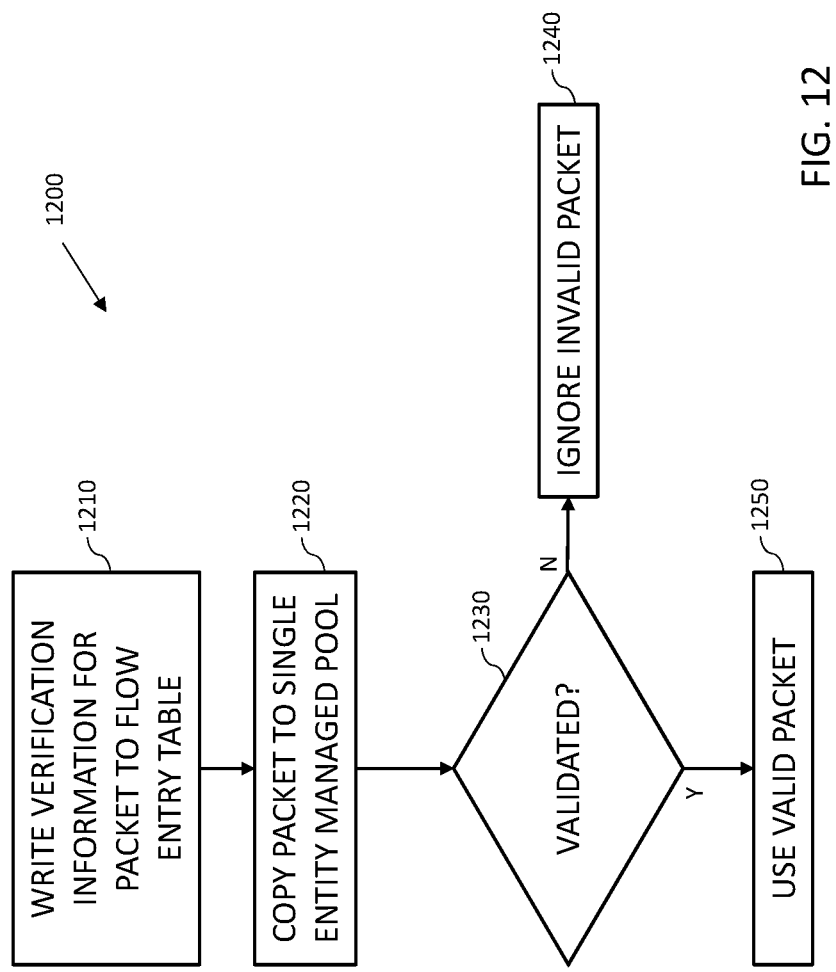
FIG. 12 is a logical flow diagram illustrating a generalized methodology for using the system of, for example, FIG. 10, in accordance with various aspects of the present disclosure.

Referring now to FIG. 12, one generalized method 1200 is shown for utilizing the validation process described herein with reference to FIGS. 10 and 11. At operation 1210, verification information for a packet (or flow of packets) is written to a flow entry table. For example, this verification information may be written upon the establishment (creation) of a channel between user space and kernel space. This verification information may include, for example, the aforementioned UUID and tuple information. In some implementations, the entire packet metadata may be written to the flow entry table at operation 1210.

At operation 1220, one or more packets (e.g., a flow of packets) are copied to a single entity managed pool of resources. These additional packets may (or may not) be associated with the verification information written to the flow entry table at operation 1210.

At operation 1230, each packet may be validated against the verification information written to the flow entry table and if validated, the driver may use the validated packet at operation 1250. However, if the packet is not validated at operation 1230, the packet may be ignored, discarded, or otherwise deleted at operation 1240.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for validating packets for a user space communication stack, the method comprising:
opening a link between user space and kernel space by the user space communication stack;
receiving packets from the user space to a first pool of resources in the kernel space;
writing verification information to a flow entry table in the kernel space upon with the opening of the link between the user space and the kernel space;
copying at least a portion of the received packets to a second pool of resources in the kernel space, subsequent to the writing of the verification information; and
validating the copied at least portion of the received packets based at least on a comparison of the written verification information in the flow entry table to corresponding metadata associated with the copied packets.

2. The method of claim 1, wherein the writing of the verification information comprises populating the flow entry table through one or more kernel application programming interfaces (APIs).

3. The method of claim 2, wherein the populating of the flow entry table comprises writing one or more of a universally unique identifier (UUID) or tuple information each associated with the user space communication stack.

4. The method of claim 3, wherein the user space communication stack is associated with a first party application, and the validating comprises validating one of the UUID or the tuple information.

5. The method of claim 3, wherein the user space communication stack is associated with a third party application, and the validating comprises validating both the UUID and the tuple information.

6. The method of claim 3, further comprising constructing a Transmission Control Protocol/Internet Protocol (TCP/IP) header for the copied packets subsequent to the validating of the copied packets, the constructing of the TCP/IP header occurring in the kernel space.

7. The method of claim 1, further comprising determining that one of the copied packets verification information does not match the written verification information in the flow entry table,. and in response to the determining, discarding the one of the copied packets.

8. A system for validating packets for a user space communication stack, the system comprising:
  an application that comprises the user space communication stack, the application residing in user space;
  a first pool of dedicated memory resources for the application, the first pool of dedicated resources associated with kernel space;
  a second pool of dedicated memory resources for a driver, the second pool of dedicated resources associated with the kernel space;
  a flow entry table configured for the validating of the packets; and
  a non-transitory computer readable apparatus comprising a storage medium having one or more computer programs stored thereon, the one or more computer programs being configured to, when executed by a processing apparatus, cause the system to:
    write verification information to the flow entry table associated with the kernel space based at least upon an opening of a link between the user space and the kernel space by the application;
    write packets from the user space to the first pool of dedicated resources associated with the kernel space, by the application, subsequent to the writing of the verification information;
    copy at least a portion of the written packets to the second pool of dedicated resources associated with the kernel space; and
    validate the copied packets in the second pool of dedicated resources based at least on a comparison of the written verification information in the flow entry table to verification information associated with the copied packets.

9. The system of claim 8, wherein the written verification information comprises packet metadata.

10. The system of claim 9, wherein the packet metadata comprises a universally unique identifier (UUID) and tuple information each associated with the user space communication stack.

11. The system of claim 10, wherein the user space communication stack is associated with a first party application and the validation of the copied packets comprises a validation of one of the UUID or the tuple information.

12. The system of claim 10, wherein the user space communication stack is associated with a third party application and the validation of the copied packets comprises a validation of both the UUID and the tuple information.

13. The system of claim 8, wherein the one or more computer programs are further configured to, when executed by the processing apparatus, cause the system to:
  determine that at least one of the copied packets verification information does not match the written verification information in the flow entry table, and in response to the determination, discard the at least one of the copied packets.

14. A non-transitory computer readable apparatus comprising a storage medium having one or more computer programs stored thereon, the one or more computer programs being configured to, when executed by a processing apparatus, cause a computerized device to:
  write one or more packets from a user space to a first pool of dedicated resources associated with a kernel space;
  write verification information to a flow entry table associated with the kernel space, the verification information being associated with an opening of a link between the user space and the kernel space by an application;
  copy at least a portion of the one or more packets to a second pool of dedicated resources associated with the kernel space, subsequent to the writing of the verification information; and
  validate the copied at least portion of the one or more packets in the second pool of dedicated resources at least by comparison of the written verification information in the flow entry table to verification information associated with the copied at least portion of the one or more packets.

15. The non-transitory computer readable apparatus of claim 14, wherein the writing of the verification information comprises a write of packet metadata to the flow entry table.

16. The non-transitory computer readable apparatus of claim 15, wherein the writing of the packet metadata to the flow entry table comprises a write of one or more of a universally unique identifier (UUID) and tuple information each associated with a user space communication stack of the application.

17. The non-transitory computer readable apparatus of claim 16, wherein the user space communication stack is associated with a first party application and the validation comprises a validation of one of the UUID or the tuple information.

18. The non-transitory computer readable apparatus of claim 16, wherein the user space communication stack is associated with a third party application and the validation comprises a validation of both the UUID and the tuple information.

19. The non-transitory computer readable apparatus of claim 16, wherein the one or more computer programs are further configured to, when executed by the processing apparatus, cause the computerized device to:
  construct a Transmission Control Protocol/Internet Protocol (TCP/IP) header for the copied at least portion of the one or more packets subsequent to the validating of the copied at least portion of the one or more packets, the construction of the TCP/IP header occurring in the kernel space.

20. The non-transitory computer readable apparatus of claim 14, wherein the one or more computer programs are further configured to, when executed by the processing apparatus, cause the computerized device to:
  determine that at least one of the copied at least portion of the one or more packets verification information does not match the written verification information in the flow entry table and in response to the determination, discard the at least one of the copied at least portion of the one or more packets.

\* \* \* \* \*